(No Model.) 2 Sheets—Sheet 1.
R. O. OSTMANN.
COUNTING DEVICE FOR LINEAR MEASURES.
No. 452,981. Patented May 26, 1891.
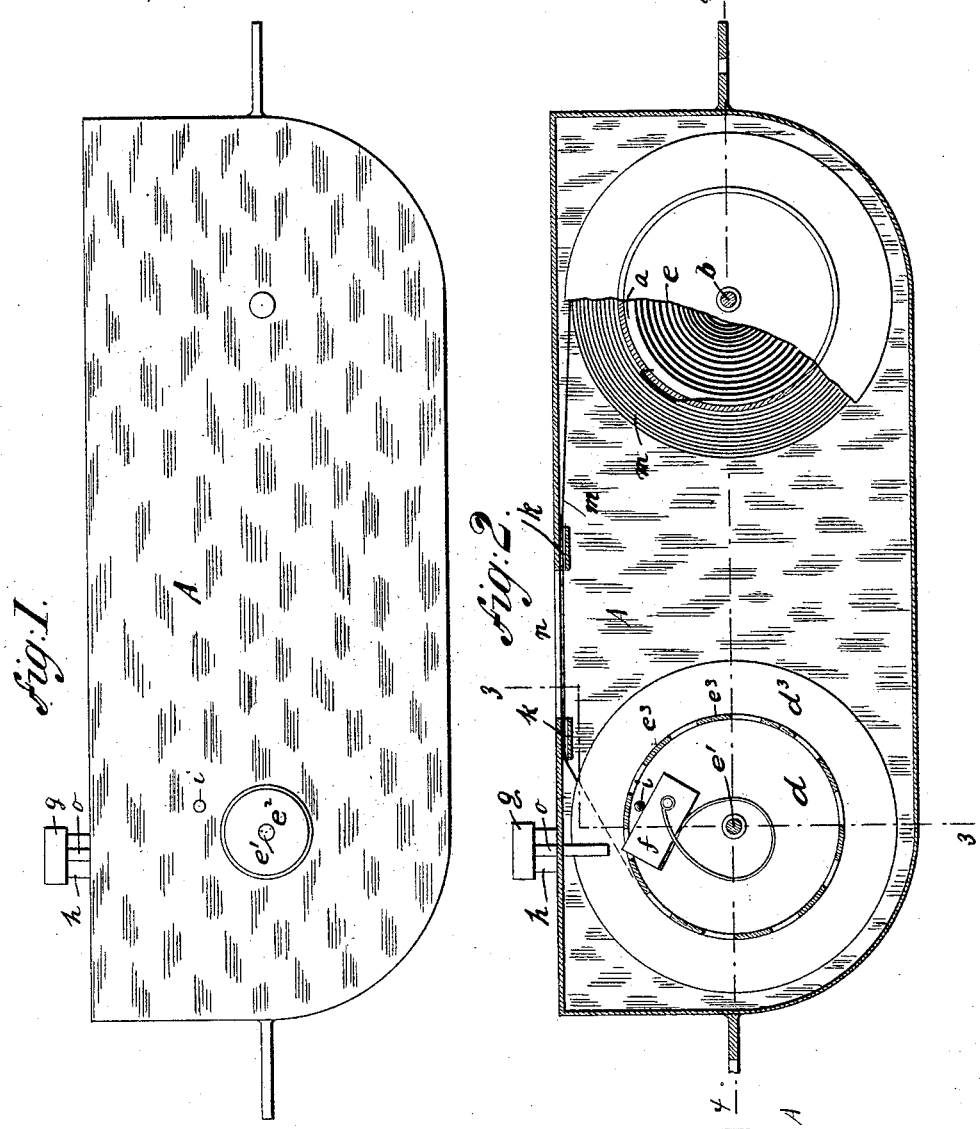
WITNESSES:
A. Schehl.
Martin Petry.
INVENTOR:
Richard Ottomar Ostmann
BY
Goepel & Raegener
ATTORNEYS (No Model.) 2 Sheets—Sheet 2.

R. O. OSTMANN.
COUNTING DEVICE FOR LINEAR MEASURES.

No. 452,981. Patented May 26, 1891.

WITNESSES:
A. Schehl.
Martin Petry.

INVENTOR:
Richard Ottomar Ostmann
BY Goepel & Ruegener
ATTORNEYS

UNITED STATES PATENT OFFICE.

RICHARD OTTOMAR OSTMANN, OF STEGLITZ, GERMANY.

COUNTING DEVICE FOR LINEAR MEASURES.

SPECIFICATION forming part of Letters Patent No. 452,981, dated May 26, 1891.

Application filed October 21, 1890. Serial No. 368,815. (No model.)

*To all whom it may concern:*

Be it known that I, RICHARD OTTOMAR OSTMANN, of Steglitz, in the Kingdom of Prussia, in the Empire of Germany, a citizen of Germany, have invented certain new and useful Improvements in Counting Devices for Linear Measures, of which the following is a specification.

This invention relates to an improved counting device for linear measurements, which is intended to be used in connection with the yard or meter measure or other measuring devices, so that the measuring of textile fabrics or linear lengths when measuring great quantities is greatly facilitated and the dimensions are counted; and the invention consists of a counting device that is used in connection with a measuring implement, as will be fully described hereinafter, and finally pointed out in the claims.

Figure 4:
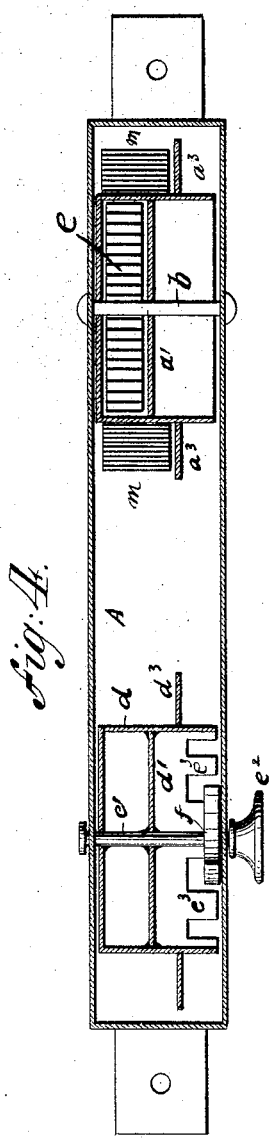

In the accompanying drawings, Figure 1 represents a side elevation of my improved counting device for measuring implements. Fig. 2 is a vertical longitudinal section of the same. Fig. 3 is a vertical transverse section on the line 3 3, Fig. 2. Fig. 4 is a horizontal section on the line 4 4, Fig. 2, and Figs. 5 and 6 are respectively a top view and a side view of a measuring implement with my improved counting device shown in position thereon.

Similar letters of reference indicate corresponding parts.

Figure 5:
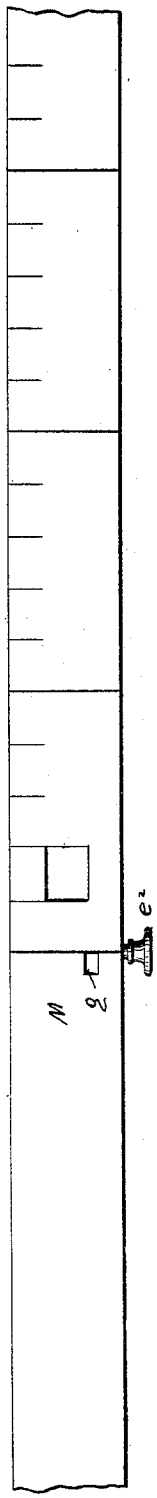
Figure 6:
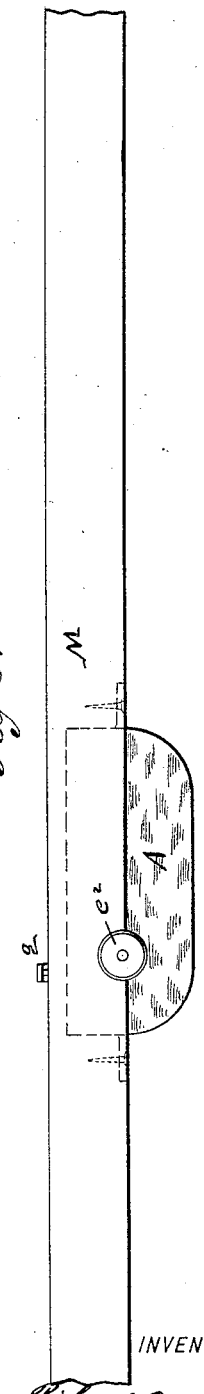

Referring to the drawings, A represents the casing of my improved counting device, which casing is made of sheet metal of suitable strength and rounded off on the lower corners, the upper part being adapted to be set into a recess of the measuring device, as shown clearly in Figs. 5 and 6. In the casing A are arranged two sheet-metal drums $a$ and $d$, of which the drum $a$ is applied loosely on an axle $b$, which is secured to the side walls of the casing A. The drums $a$ and $d$ are divided by partitions $a'$ and $d'$, respectively, into two parts, of which the rear part is closed while the front part is open. In the rear part of the drum $a$ is arranged a coil-spring $e$ in the nature of a watch-spring, the inner end of which is attached to the axle $b$, while the outer end is attached to a point on the circumference of the drum $a$, the connection of the spring and drum being made in such a manner that when a band $m$, that is attached to the drum $a$, is pulled from the drum $a$ the coil-spring $e$ is set to tension. The band $m$ is made of any suitable length and is wound upon the drum $a$. It is guided on said drum by means of a circumferential flange $a^3$, which is soldered to the drum $a$ and prevents the band $m$ from shifting toward the side walls of the casing A, so as not to interfere with the proper turning of the drum. The band $m$ is passed through keepers $k$, that are arranged at the under side of the top of the casing, said keepers being located at the ends of the opening $n$ in the top of the casing, through which the band $m$ can be seen from the outside. The opposite end of the band $m$ is attached to the circumference of the drum $d$ in the same manner as its other end is attached to the drum $a$. The band $m$ is preferably made of stout linen or other suitable material and provided with numbers from 0 to 100 and more, if desired, which are printed thereon, preferably in black oil colors in equal distance and in successive order. The drum $d$ is of exactly the same size as the drum $a$, and the partition $d'$ is rigidly attached to the axle $e'$ of the drum $d$, said axle turning in bearings of the casing A. The axle $e'$ is provided with a milled button or key $e^2$ at its front end, which can be used for turning the drum $d$, and thereby winding the ribbon $m$ on the same. The front part of the drum $d$ is recessed, so as to form teeth $e^3$ between the recesses. These recesses are engaged by a spring-pawl $f$, which is arranged on the front wall of the casing A within the circumference of the drum $d$, and in such a manner that the turning of the drum $d$ can only be accomplished toward the left, while the turning of the drum $d$ in opposite direction toward the right is rendered impossible. A pin $i$ is applied to the front wall of the casing A, and against which the pawl $f$ rests. The drum $d$ is provided like the drum $a$ with a circumferential flange $d^3$, so that the ribbon $m$ is guided thereby and prevented from shifting forward and covering up the recesses between the teeth formed on the front edge of the drum $d$. If the wheel or key $e^2$ on the axle $e'$ is turned toward the left, the band or ribbon $m$ is wound up on the circumference of the drum $d$ and unwound from the drum $a$, whereby the spring $e$ in the latter is set more and more in tension. Above the locking-spring $f$ is arranged a spring-actuated push-button $g$, which is supported by a spring $h$, and which when pressed down presses the pin or shank $o$ upon the end of the spring-pawl $f$, so that the same is pressed downward and clears the recesses in the front edge of the drum $d$. The tip of the shank $o$ then follows the pawl $f$ into the recess in the drum and retains the latter in this position, while the tip of the pawl is allowed to pass inside the next adjacent tooth $e^3$. The return upward movement of the shank $o$, caused by the removal of the operator's finger and the expansive force of the spring $h$, withdraws the tip of said shank from the drum $d$, so that the same is released and turned on its axis by the action of the coil-spring that is locked in the housing of the drum $a$. This motion can only take place for a distance of one tooth, as immediately on release of the push-button $g$ and the lifting of its pin or shank $o$ the spring-pawl $f$ engages the next tooth of the ratchet-wheel arrangement formed on the edge of the drum $d$, so that the drum is locked again until the next depression of the push-button takes place. The figures on the band $m$ are so arranged that for each pressure on the push-button $g$ one of the figures is exhibited in the opening $n$ of the casing $A$, while simultaneously the drums and the band $m$ are turned for the distance of one tooth. If the ribbon is wound up entirely on the drum $d$, there will appear in the top opening of the casing $A$ successively numbers 1, 2, &c., of the band until the same is entirely transferred to the circumference of the drum $a$ when the figure "100" will appear in the opening $n$. In this manner the number of yards or other linear length can be readily counted off on the band, until the same is entirely transferred to the spring-drum $a$. The band $m$ is then returned to the drum $d$ by turning the same on its axis until zero appears in the opening $n$ of the casing $A$.

By seating the counting device in a recess of a yard, meter, or other measure $M$, or in a recess of a measuring-table, the counting device registers automatically the number of yards, &c., that are measured off without any extra handling, as the fabric is always held by a pressure of the thumb at the zero point of the measure, at which point also the push-button $g$ has to be arranged. The counting device can also be used for surveyors' measuring-rods, and so on, in which case the push-button has to be at the end of the measuring-pole and has to be pressed slightly when the pole is laid on the ground, so that the action of the counting device can take place.

When the apparatus is used in connection with a one-half yard or meter measure it will count off fifty yards or meters, successively, while for the larger measures one hundred yards are counted when they are measured off, after which the ribbon is returned to the drum $d$ by turning the key.

Having thus described my invention, I claim as new and desire to secure by Letters Patent—

In a counting device, the combination of a casing provided with a slight opening, a spring-actuated drum $a$ within said casing, a band wound on said drum and passing beneath said opening, said band having ordinal numbers thereon, a drum $d$, also within said casing, mounted on a shaft projecting through the casing and having a key $e^2$ on one end, circumferential flanges on said drums for keeping the band in position, the drum $d$ being provided with recesses outside its flange, forming interposed teeth $e^3$, a pawl $f$, pivoted to the casing inside the drum $d$, a spring pressing said pawl outwardly and normally into engagement with the teeth, a push-button $g$, having a shank $o$ passing through the top of the casing outside the flange on the drum $d$ and adapted to engage the tip of the pawl, and a spring holding said button normally raised, as and for the purpose set forth.

In testimony that I claim the foregoing as my invention I have signed my name in presence of two subscribing witnesses.

RICHARD OTTOMAR OSTMANN.

Witnesses:
GEORG BOREHARD,
HERRMANN ZIMMERMANN.